(12) United States Patent
Graber

(10) Patent No.: US 8,111,585 B1
(45) Date of Patent: *Feb. 7, 2012

(54) UNDERWATER ACOUSTIC TRANSDUCER ARRAY AND SOUND FIELD SHAPING SYSTEM

(76) Inventor: Curtis E. Graber, Woodburn, IN (US)

( * ) Notice: Subject to any disclaimer, the term of this patent is extended or adjusted under 35 U.S.C. 154(b) by 378 days.

This patent is subject to a terminal disclaimer.

(21) Appl. No.: 12/378,603

(22) Filed: Feb. 18, 2009

Related U.S. Application Data

(60) Provisional application No. 61/066,605, filed on Feb. 21, 2008.

(51) Int. Cl.
*G01S 7/521* (2006.01)
(52) U.S. Cl. .......................................... 367/151
(58) Field of Classification Search .................. 367/151; 181/155
See application file for complete search history.

(56) References Cited

U.S. PATENT DOCUMENTS

| | | | | |
|---|---|---|---|---|
| 4,348,750 A | * | 9/1982 | Schwind | 367/140 |
| 4,530,077 A | * | 7/1985 | Dorr | 367/140 |
| 4,796,009 A | | 1/1989 | Biersach | |
| 4,836,328 A | | 6/1989 | Ferralli | |
| 5,616,892 A | * | 4/1997 | Ferralli | 181/155 |
| 5,764,783 A | | 6/1998 | Ferralli | |
| 7,621,369 B2 | * | 11/2009 | Graber | 181/155 |
| 7,766,122 B2 | * | 8/2010 | Graber | 181/155 |
| 7,837,006 B1 | * | 11/2010 | Graber | 181/144 |
| 2008/0084787 A1 | * | 4/2008 | Graber | 367/96 |
| 2008/0121459 A1 | * | 5/2008 | Graber | 181/155 |
| 2009/0277712 A1 | * | 11/2009 | Graber | 181/155 |

FOREIGN PATENT DOCUMENTS

| | | |
|---|---|---|
| WO | WO 2006/016156 A1 | 2/2006 |
| WO | WO 2007149303 A2 * | 12/2007 |

\* cited by examiner

*Primary Examiner* — Daniel Pihulic
(74) *Attorney, Agent, or Firm* — Paul W. O'Malley; Susan L. Firestone

(57) ABSTRACT

A sonar system includes an objective having reflecting surface(s) with coincident forward radiant axes. Each of the reflecting surfaces defines sets of equivalent acoustic output/receiving locations allowing the use of a plurality of transducers with each reflecting surface. When used in a projection mode, and depending upon the frequency radiated, the sound sources may function as a distributed, functionally continuous sound source. In a passive mode use of a field reflector allows determination of bearings.

12 Claims, 8 Drawing Sheets

UNDERWATER ACOUSTIC TRANSDUCER ARRAY AND SOUND FIELD SHAPING SYSTEM

PRIORITY CLAIM

This application claims the benefit of U.S. Provisional Patent Application Ser. No. 61/066,605 filed 21 Feb. 2008.

BACKGROUND

1. Technical Field

The field relates broadly to sonar and more particularly to transducer arrays and to sound field shaping and focusing elements for use with transducer arrays.

2. Description of the Problem

In active sonar systems arrays of acoustic transducers operate to combine the outputs from a large plurality of transducers to combine the sound waves from the individual transducers to narrow and intensify the sound field into a sound beam and, by selectively weighting or adjusting the phase of the input signal to individual transducers, to direct the beam. Typically the transducers have been deployed in a plane arranged in rows and columns, though other approaches are known, see for example WO 2006/016156. Directivity is improved and dispersion reduced with each additional row or column of transducers, however, improved directivity is largely a byproduct of increased destructive summation between the sound fields produced by individual transducers. While such arrays allow beams of high intensity to be generated, the gains obtained with each additional row or column of transducers quickly grow small in comparison to the number of transducers added at each step. While such diminishing returns are characteristic of many systems, they are pronounced in flat matrix like arrays.

Parabolic dishes have also been used to reduce the dispersion of a sound field to produce a beam. Meyer et al., in U.S. Pat. No. 5,821,470, describe a Broadband Acoustical Transmitting System based on a parabolic reflector incorporating two loudspeaker transducers. Meyer may be taken as representative of such systems in that he provided one transducer be spaced from the dish, forward along the intended axis of propagation of sound and located at the focal point of the dish. The focal point transducer was horn loaded and oriented to propagate sound backward along the radiant axis and into the dish for reflection in a collimated beam. Meyer added a second transducer for low frequency sound. The second transducer was located opposed to the horn loaded transducer and on the radiant axis of the dish, flush mounted in the dish and oriented for forward propagation of sound centered on the radiant axis. At this location the low frequency transducer derives relatively little benefit from the dish as a focusing element, though the dish still serves as a baffle.

Underwater systems, particularly sonar systems, frequently rely on piezoelectric transducers which can be readily applied both to the efficient generation of sound and for the efficient generation of electrical signals in response to impinging sound. Thus arrays of such transducers are more readily applied both for sound generation and sound reception when immersed in water than systems using transducers optimized for use in a compressible medium such as those built for atmospheric use.

SUMMARY

A sound system for the projection or reception of sound employs a reflecting structure including an "acoustic objective" which includes at least a first objective reflecting surface. The acoustic objective comprises one or more reflecting surfaces characterized by a focus which comprises a set of non-coincident acoustic transducer locations for either generation or detection of sound. The acoustic objective defines a forward radiant axis for the system when in its sound projection mode, and where the acoustic objective includes more than one reflecting surface, the surfaces may be positioned one relative to the other to have a common forward radiant axis.

The focus points usually lie in a plane and may be a closed loop such as a ring. Each acoustic objective may be positioned and shaped to define its own set of equivalent acoustic projection/receiver locations. The selection of the shape of each acoustic objective may be done to produce a set of equivalent transducer locations in a ring of non-zero circumference centered on the forward radiant axis.

An array of transducers is positioned on the dispersed focus for each acoustic objective with the transducers located at discrete locations and with the transducers aimed to radiate into, or receive sound from, its respective reflecting surface of the acoustic objective. Depending upon the selected shape for the focus, the transducers of a given array are spaced to operate in their radiating mode as a closed loop line array. The spacing between the transducers is then determined by reference to the highest intended operating frequency of the array. The transducers may be aimed to radiate inwardly toward or outwardly from the forward radiant axis, depending upon whether the acoustic objective is a cone type or a dish type.

An example objective includes an inner reflecting surface (cone type) and an outer reflecting surface (dish type). The inner reflecting surface is formed from a cone reflector having its axis aligned on the intended radiant axis. The outer reflecting surface may be a forward concave annular ring resembling a dish and typically is disposed around the cone reflector. The shapes of the reflecting surfaces may be made parabolic relative to the forward radiant axis to define an inner focal ring and an outer focal ring.

The sound system may be operated as a directionally sensitive listening device. Addition of a field reflector forward from the base system along the radiant axis allows the system to be used to determine a bearing to a sound source where the transducer elements are discrete elements.

DETAILED DESCRIPTION

The present application incorporates by reference U.S. patent application Ser. No. 11/454,914 filed 16 Jun. 2006 for an Acoustic Energy Projection System, now issued as U.S. Pat. No. 7,621,369.

Figure 1:
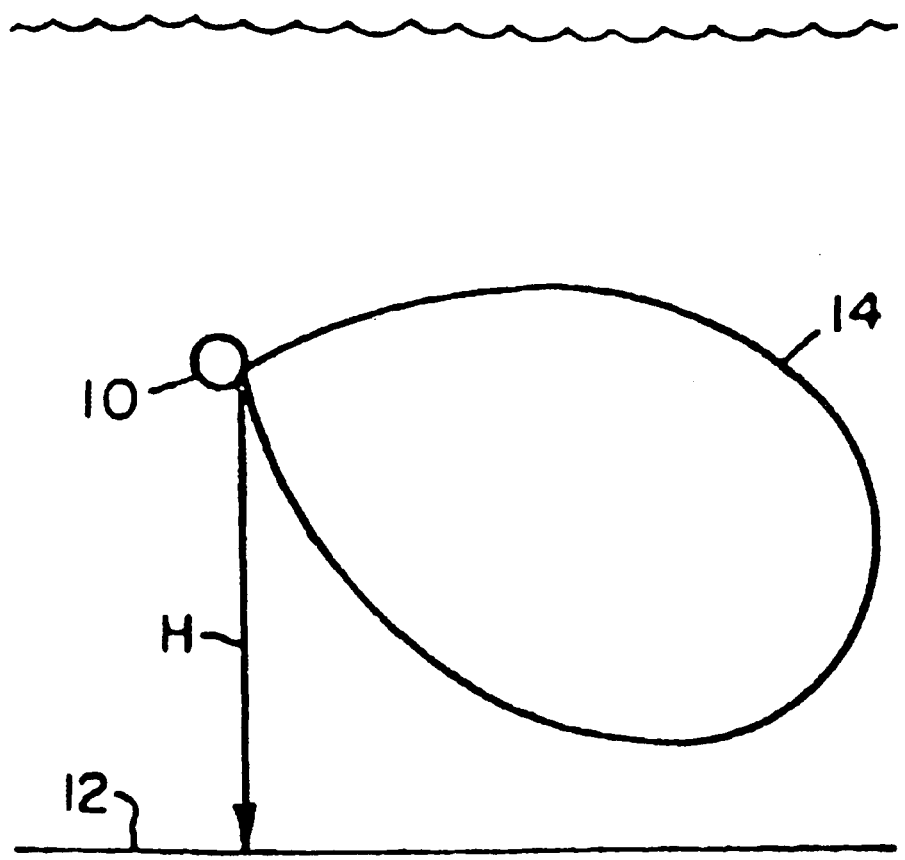
FIG. 1 is an elevation of a sound field for a active sonar transducer array.

In FIG. 1 a carrier 10, such as a submersible watercraft, projects a sonar beam in a beam pattern 14 at a height H above the sea bottom 12. To tighten the beam pattern 14 and deliver high energy levels into the beam, transducer arrays have been employed which have had large surface areas over which rows and columns of transducers were disposed. The degree of flatness, or narrowness, and the direction in which the flatness to be obtained, dictated the pattern of the array.

Figure 2:
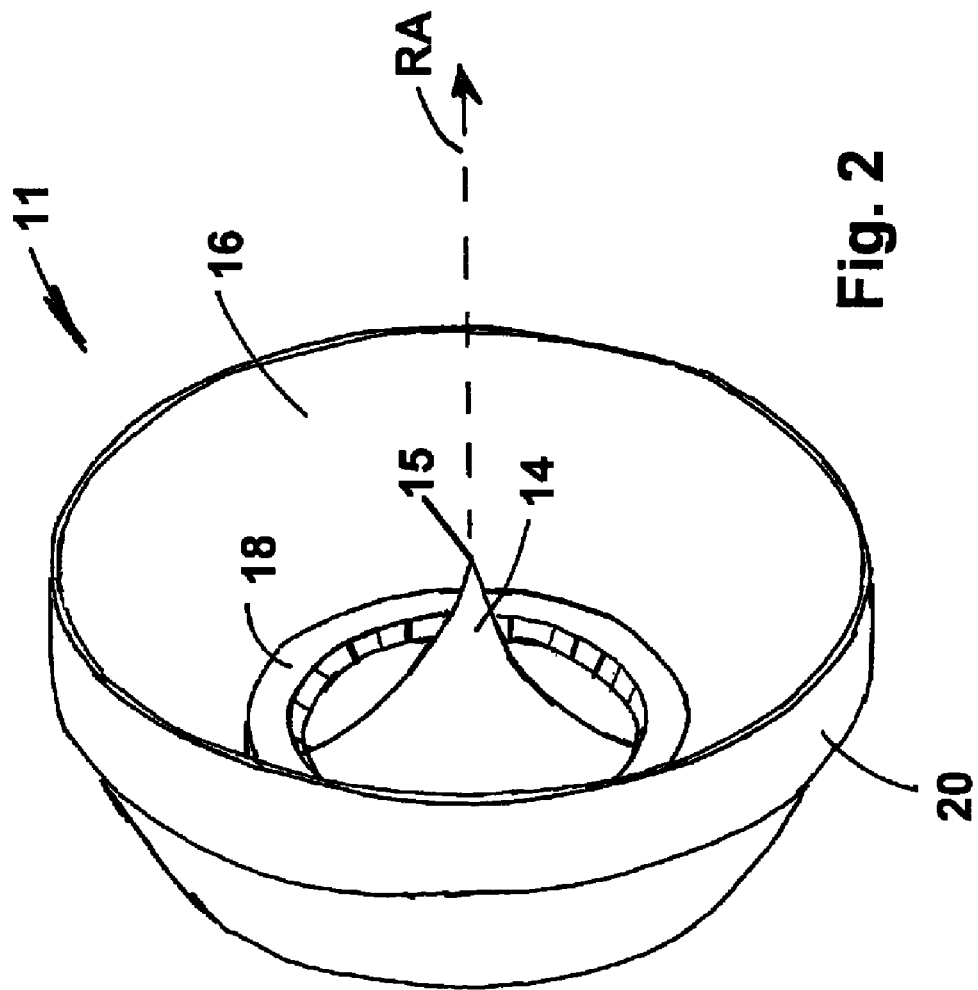
FIG. 2 is a perspective view of an embodiment of an underwater sound projector having inner and outer reflecting surfaces with coincident forward radiant axes.
Figure 3:
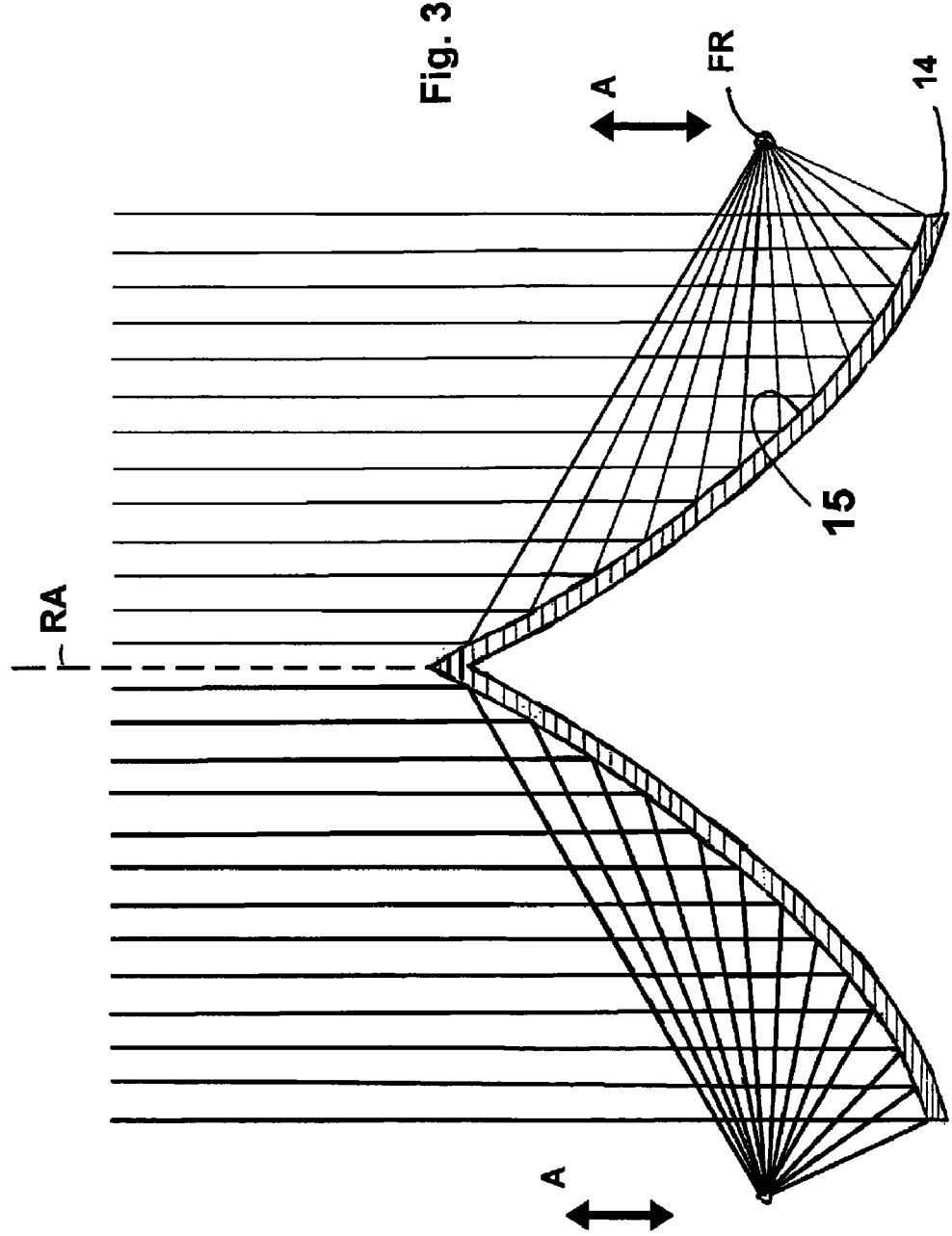
FIG. 3 is a cross sectional diagram depicting operation of an inner reflecting surface for a sound radiator.

Referring to FIG. 2 an underwater acoustic system 11 for producing a narrow beam pattern or receiving sound from a narrow field of view is shown featuring an objective 17 comprising two acoustically reflective surfaces 14 and 16, the first corresponding to the outer surface of an inner cone 15 and a second reflecting surface 16 formed by a forward concave annular bowl formed by the interior of shell 20 and which is disposed circumferentially outwardly from the cone 15. The reflecting surfaces 14 and 16 of objective 17 may have hyperbolic or parabolic section taken in planes including the radiant axis RA. This is shown for reflecting surface 14 in FIG. 3. A cone having a reflecting surface which has a constant hyperbolic or parabolic section in any section including the radiant axis RA will have a focal ring FR of equivalent acoustic output (or input) locations in a circle encircling the radiant axis. The focal ring FR has a non-zero circumference and encircles the cone 15 centered on the radiant axis RA. The focal ring FR defines the location of equivalent output or input points for sound radiating forward (i.e. in the direction the apex of the cone points in) or for sound received inbound along the axis. If the reflecting surfaces of the objective are scalloped the focal ring FR will not be continuous.

A possible location for an annular array 18 of acoustic transducers is near the base of cone 15. Transducers are located along the focal ring FR and, when operating in projection mode, are oriented to direct sound energy against the reflecting surface 14. Such placement of the transducers results in a highly collimated forward sound field exhibiting little dispersion. It might be observed that if the transducers are moved forward and backward along the radiant axis RA (as indicated by double headed arrow A), the field can be made more dispersive, or given a far field convergence point forward from cone 14. A second array of transducers may be used with reflecting surface 16.

A plurality of transducers may be placed at discrete, evenly spaced locations along a focal line or ring. Transducers may be directed inwardly or outwardly perpendicular to the radiant axis RA with generated sound being reflected forward along the radiant axis in a low dispersion, collimated beam. For inwardly directed systems using a cone some leakage occurs toward the tip of the cone reflector due to lack of reflective surface area there. Thus a substantial portion of a tip for a cone 15 may be dispensed with leaving a truncated cone. With transducers arranged in what is in effect an annular, closed loop line array, divergence of the sound field directed into the reflecting surface is reduced. Transducers are located discretely spaced from one another by no more than one quarter of a wavelength of the highest intended operating frequency of the device. The beam may be turned by physically turning the sound system. When used as a listening device sound system exhibits should exhibit directional sensitivity comparable to a parabolic receiving dish, but having more receiving transducers.

The parabolic section for a hyperbolic cone reflector follows the equation:

$$Y = X^2/4F$$

where F is the focus, X is width and Y is height. Non-parabolic section curves are conceivable, as is a cone reflector with straight faces. Of course such surfaces do not have the same focus characteristics as hyperbolic shapes do.

Figure 4:
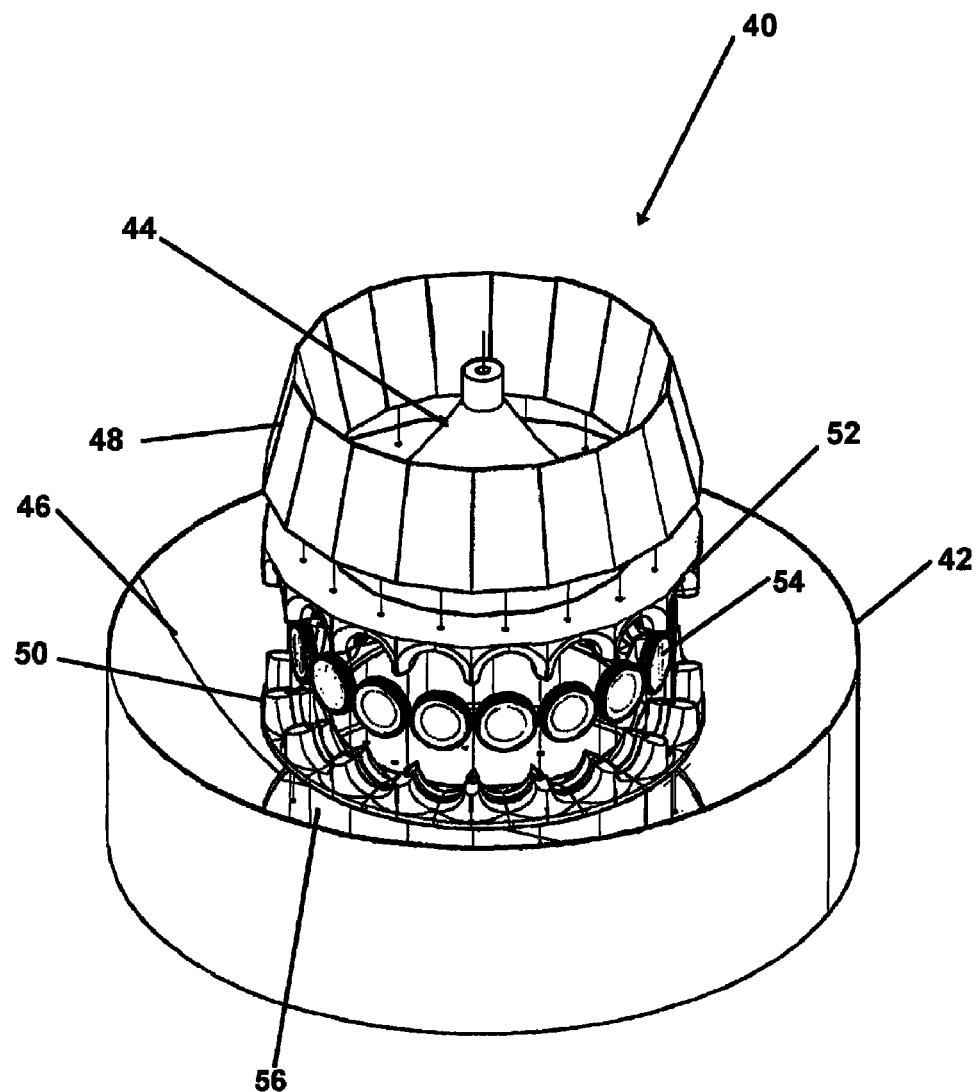
FIG. 4 is a cross sectional view of a projector having dual reflecting surfaces.

FIG. 4 is an exploded view of a acoustic system 40 which comprises an objective having first and second reflectors, including an inner cone reflector 44 and an outer bowl reflector 46. The outer bowl reflector 46 is supported on the interior of an outer shell 42 which encircles the assembled projection system 40. A plurality of transducers 54 are disposed in inner and out closed loop line arrays, nestled for support between a lower transducer cradle 50 and an upper transducer cradle 52. An annular phase plug or summation cone 48 rests on top of the upper transducer cradle 52. The terminology "on top of" treats "up" as being in the direction of propagation of acoustic radiation regardless of the actual orientation of the acoustic system 40 when used in its projection mode. The assembly of lower and upper cradles 50, 52, arrays of transducers 54 and phase wedge 38 rest on a bottom interior surface of the shell 42. For underwater use the inner cone reflector 44, outer shell 42, cradles 50, 52 and phase wedge 48 may be cast in aluminum.

Figure 5:
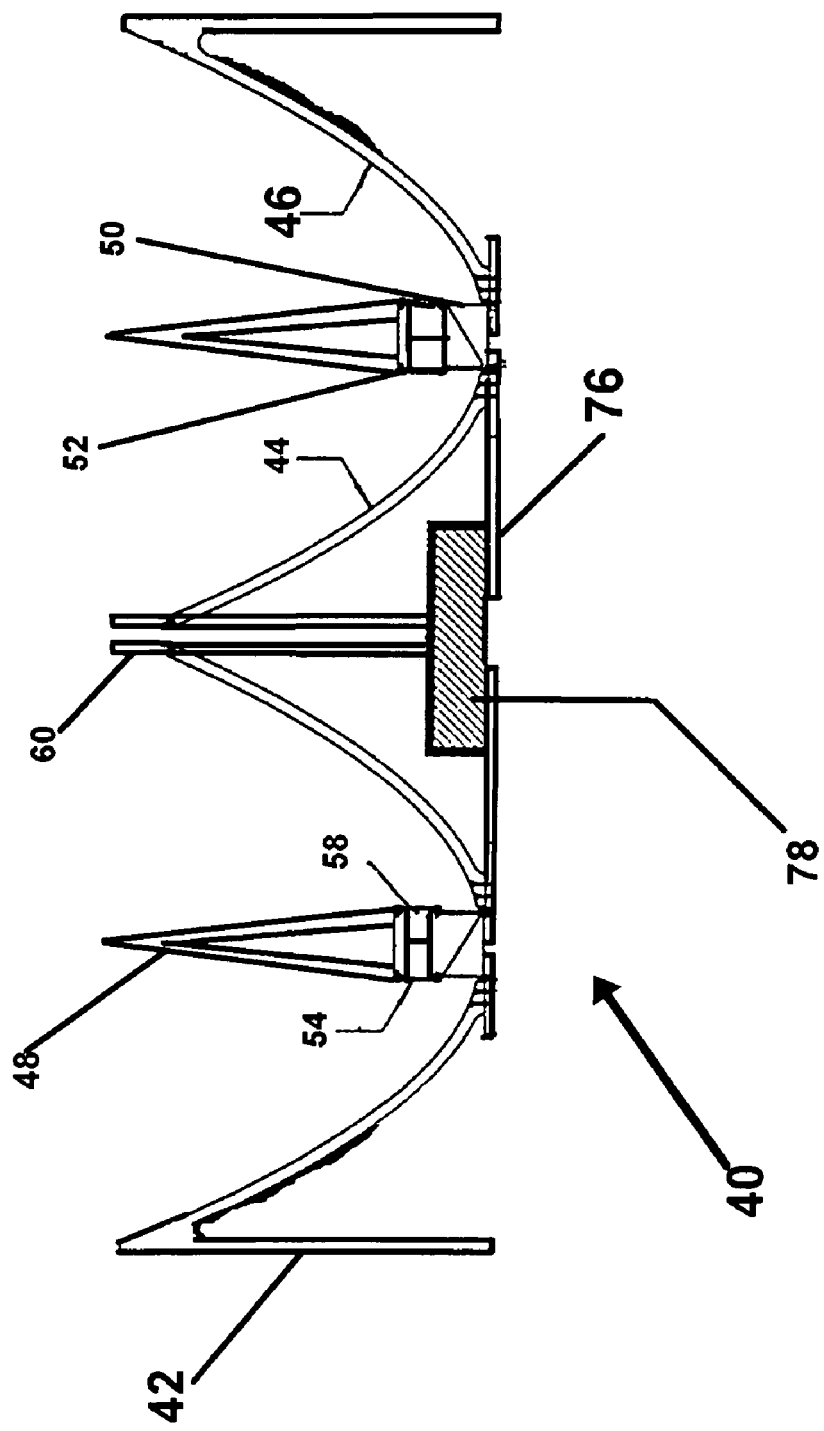
FIG. 5 is an exploded view of another embodiment of a projector.

FIG. 5 illustrates in cross section an objective for the acoustic system 40 of FIG. 4. Inner and outer reflecting surfaces 44 and 46 can be seen to a cross sectional profiles in the plane including radiant axis RA. The assembly of lower transducer cradle 50, inner and out arrays of transducers 54 and 58, upper transducer cradle 52 and the annular phase wedge 48 rest on a support plate 76. A support electronics package 78 may be housed within inner cone 44. An open tube support post 60 centered on the radiant axis of projector 40 and extending through the apex of inner cone 44 provides a foundation in which to mount a field reflector as described with reference to FIG. 6. The outer bowl reflector 46 is parabolic in its sections, but differs from a conventional parabolic dish in that the bases of the parabolic sections to not meet at a single point in the base of the bowl, but instead forms a circle defining an annular gap (in which the transducer cradle and inner cone are fitted). Support plate 76 can substantially cover this gap excluding ports for introduction of electrical leads. Inner and outer arrays of transducers 54, 58 are provided along the respective focal rings for the pair of reflecting surfaces.

Figure 6:
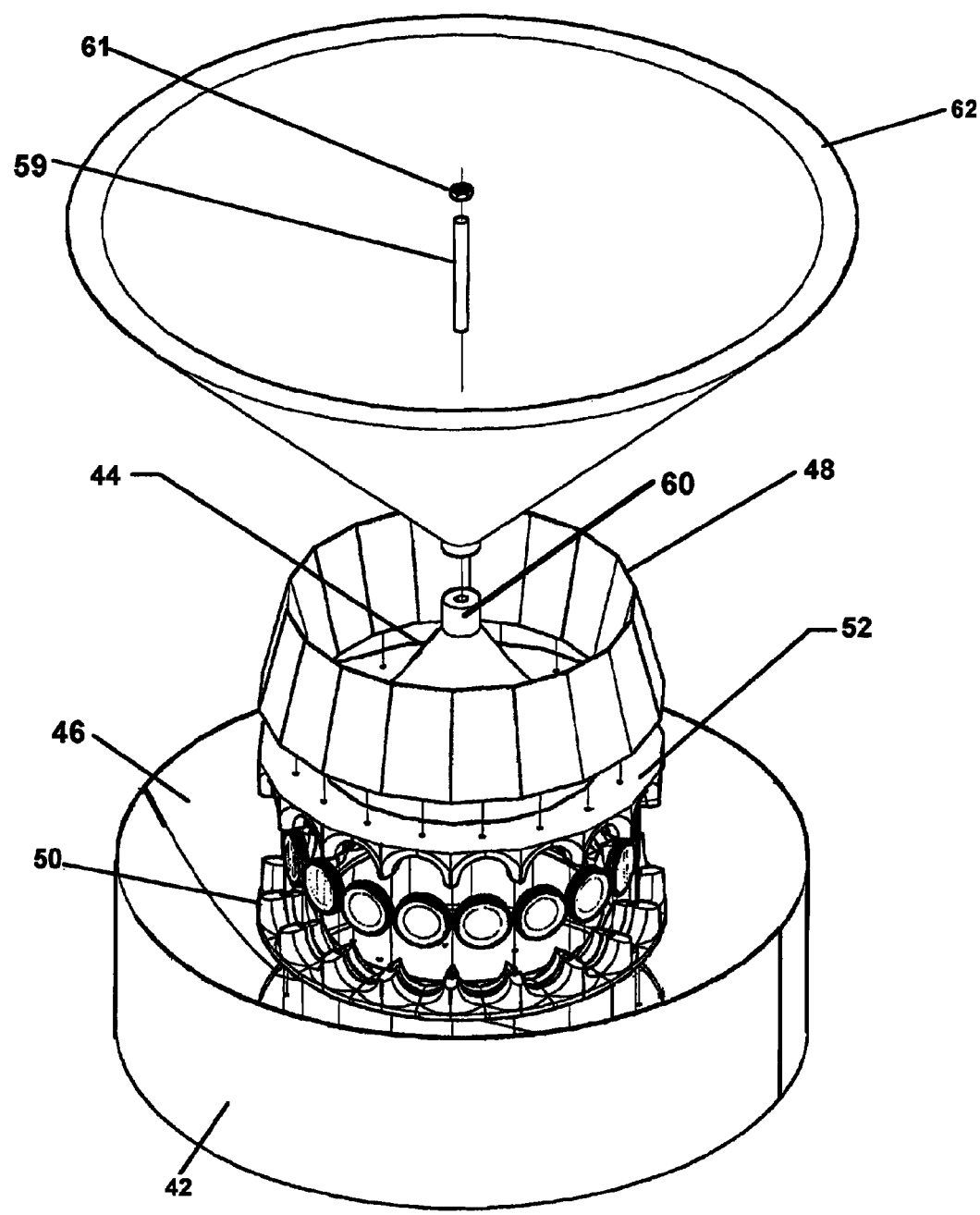
FIG. 6 is an exploded view of the projector of FIG. 5 modified to operate as a passive sonar element.

FIG. 6 illustrates fitting of a field reflector 62 to the support post 60 using a stud 59 and retaining nut 61. Sound projected forward from the base system 40 and impinging against the field reflector 62 is projected radially outwardly from the radiant axis in a plane transverse to the radiant axis RA up to and including the full 360 degree arc. Field reflector 62 allows use of acoustic system 40 in its receiving mode to be used to determine a bearing to a sound source. Conventionally, in an underwater acoustic device, the acoustic transducers 54, 58 are piezoelectric elements and efficiently generate electrical signals from impinging sound waves as well as operating to produce sound waves from electrical signals applied to the transducers. Thus, with the application of appropriate electronics, acoustic system 40 operates in a projection mode or in a listening mode. With field reflector 62 fitted to the acoustic system 40 the sound signals reaching given transducers 54, 58 in the inner and outer arrays will vary with the bearing to the sound source. Acoustic system 40, with the fitted secondary radial reflector 62, can be used to determine the relative bearing to the target from the strength of the outputs from the transducers 54, 58 based on knowledge of the position of the transducers in the arrays. Field reflector 62, in order to operate for bearing determination, is formed as a cone with an inverted apex (relative to the direction of propagation of sound in the projection mode) centered on the radiant axis of the system 40. At present other configurations for the field reflector have not been considered, although other shapes might be dictated by changes to the objective, or if system 40 were to be configured for different types of geological surveys, in a manner analogous to use of a Schmidt camera for sky surveys. Field reflector 62 is not limited to use of the system in a passive mode but can also be used to radially distribute an outgoing pulse.

Figure 7:
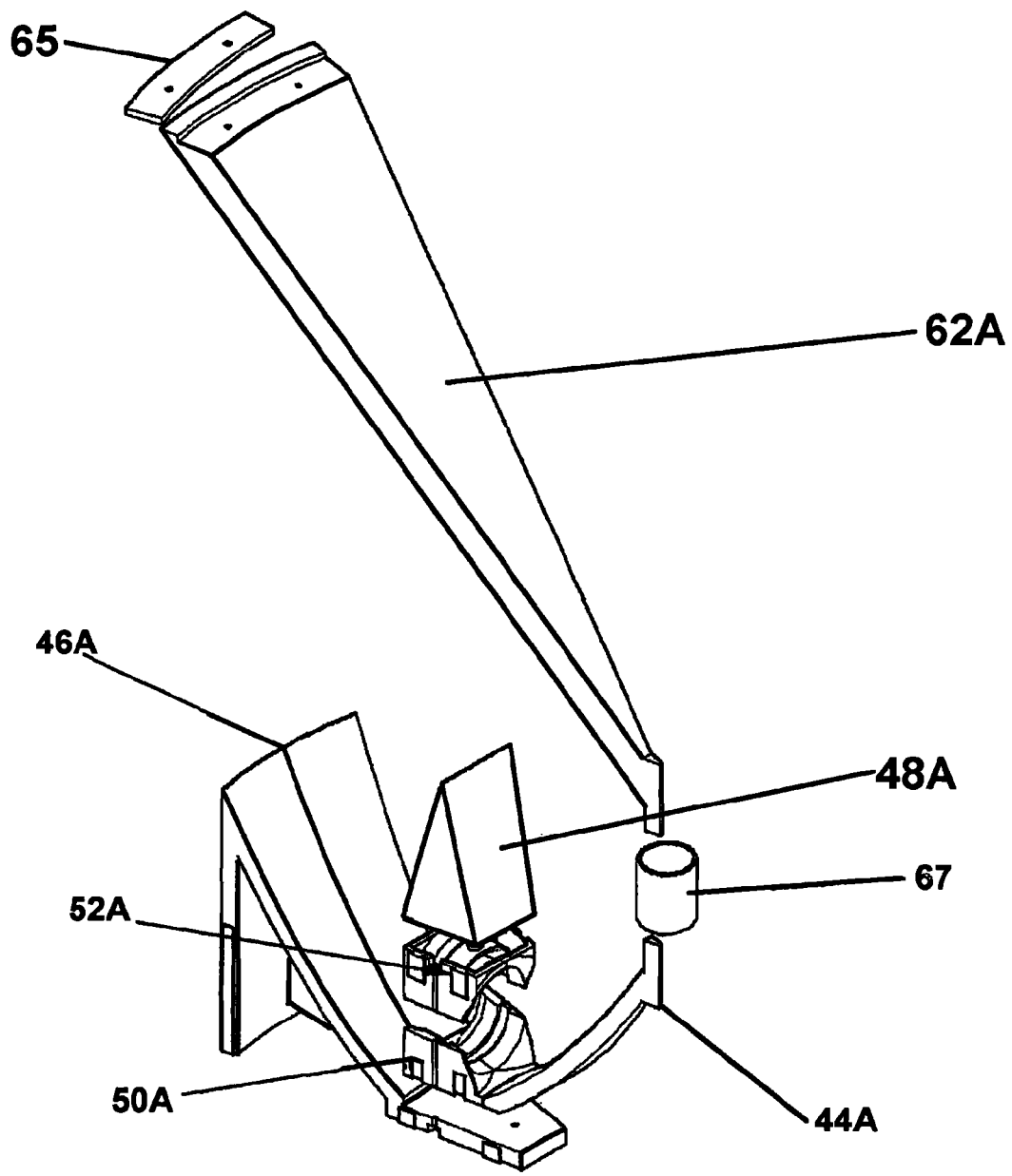
FIG. 7 is a exploded sectional view of the embodiment of FIG. 6.

FIG. 7, with minor modifications to the mounting method for the field reflector 62, illustrates sections of the sound system of FIG. 6. The sections of the device may be cast as sections. Lower cradle section 50A and upper cradle section 52A provide support two transducers, one associated with the inner array and one with the outer array. The curvature of the outer bowl reflector section 46A and the inner cone reflector section 44A bowing away from the cradles is illustrated. A ring bracket 67 is shown as an alternative method of attaching the field reflector section 62A. A phase wedge section 48A rests on top of upper transducer cradle section 52A.

Figure 8:
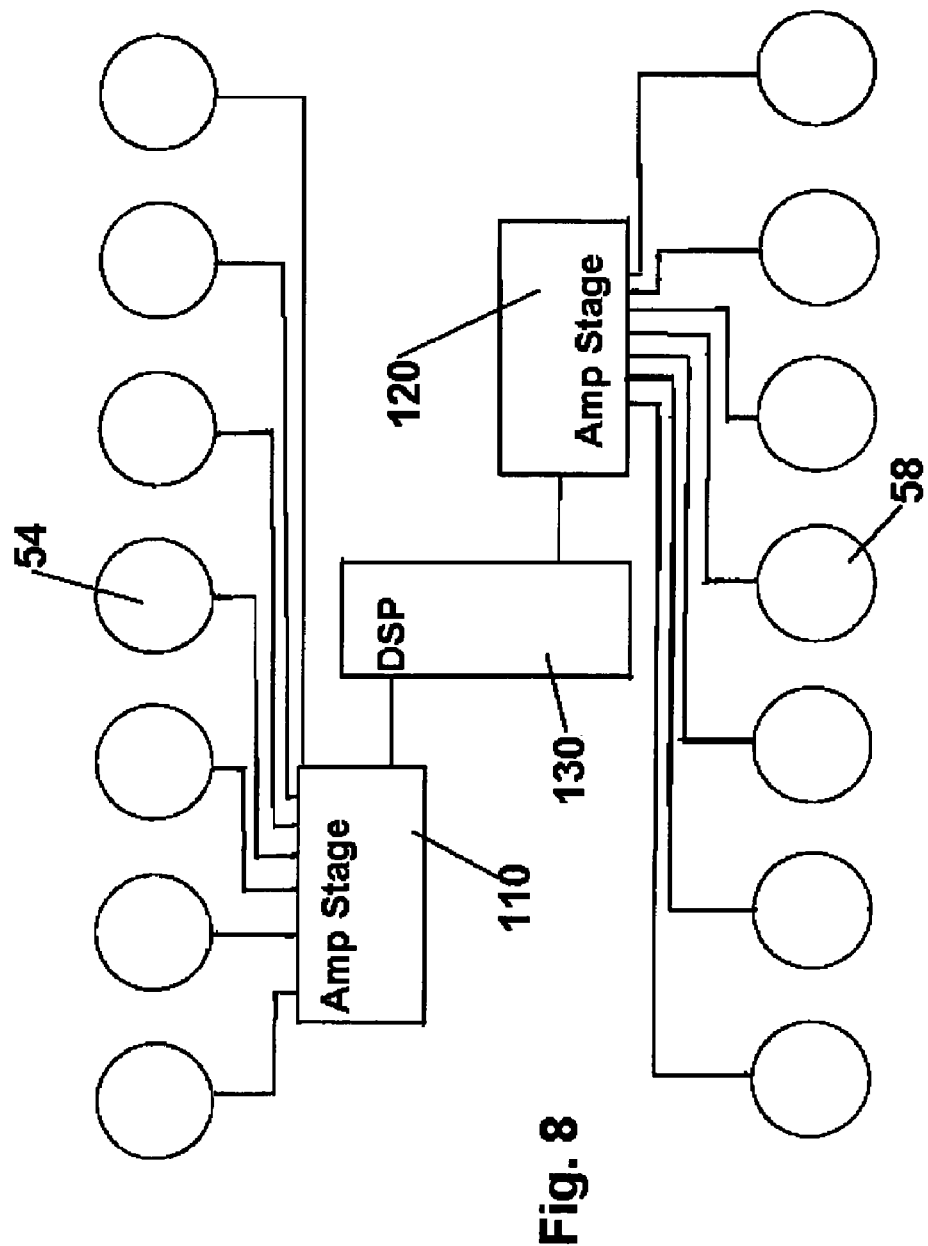
FIG. 8 is a block diagram of support circuitry for the device.

FIG. 8 illustrates a simplified block diagram of representative sound processing circuitry for the system of FIGS. 5-7. Arrays of transducers 54 and 58 are represented connected to amplification stages 110, 120 which represent conventional amplification and analogue to digital conversion both for the generation of sound and the processing of sound inputs and could in theory be used to apply the phase adjustment and weighting of the signals to the individual transducers as is done in planar arrays. Digital signal processing circuitry (DSP) 130 can be you used to analyze incoming signals transducer by transducer to determine a bearing based on the strength of the signal received from each transducer and knowledge of the individual transducers' positions in the arrays. Generally outgoing pulses will be concurrent around the arrays.

The acoustic systems disclosed here allow the outputs from a potentially large plurality of sources located at acoustically equivalent locations with minimal destructive summing of the sources to produce a collimated sound field in an underwater environment. Employed in a passive or listening mode the system can be used for bearing determinations among other applications.

What is claimed is:

1. An acoustic system comprising:
   an objective including a shaped reflecting surface having a forward radiant axis, the shaped reflecting surface defining a focus along a ring of non-zero circumference centered on the forward radiant axis;
   a plurality of transducers distributed on the focus in a closed loop with the plurality of transducers arranged and adjacent transducers spaced for operation as local approximations of a linear array;
   the transducers being operable in a projection mode or a receiving mode; and
   driver circuitry for operating the plurality of transducers in frequency ranges and phase relationships for operation as approximations of linear arrays.

2. An acoustic system as claimed in claim 1, the objective further comprising:
   inner and outer reflecting surfaces, the inner reflecting surface being formed on a cone reflector having a central axis aligned on the forward radiant axis and the outer reflecting surface being a forward concave dish disposed around the cone reflector; and
   the inner and outer reflecting surfaces having a forward radiant axes which are coincident with the forward radiant axis.

3. An acoustic system as claimed in claim 1, further comprising:
   a field reflector disposed across the forward radiant axis.

4. An acoustic system as claimed in claim 3, further comprising:
   the plurality transducers distributed along the ring;
   processing circuitry coupled to receive electrical signals produced by the transducers responsive to impinging sound and to determine a bearing to the source of the sound based on the location of the transducers in the array based on characteristics of the sound.

5. An acoustic system as claimed in claim 4, further comprising:
   the field reflector being oriented with respect to the forward radiant axis for distributing radiated sound radially outwardly from the forward radiant axis.

6. A sonar system comprising:
   a cone reflector, the cone reflector having a base and an apex and being shaped to define a focal ring encircling the cone in a plane perpendicular to an axis through the apex;
   an array of transducers disposed at discrete, evenly spaced locations along the focal ring;
   driver circuitry for generating sound from the array of transducers at frequencies and phase relationship so that adjacent transducers operate as approximations of linear arrays; and
   a field reflector positioned across a radiant axis from the cone reflector.

7. A sonar system as set forth in claim 6, further comprising:
   a dish reflector, the dish reflector being disposed radially outwardly from the cone reflector and shaped to define a second focal ring relative to the dish reflector;
   a second array of transducers disposed at discrete locations along the second focal ring;
   a cradle positioned between the cone reflector and the dish reflector in which the first and second arrays of transducers are mounted; and
   an annular phase wedge mounted on the cradle.

8. A sonar system as set forth in claim 7, further comprising:
   the driver circuitry further operating for generating sound from the second array of transducers; and
   the field reflector being positioned across a coincident radiant axis for the dish reflector and the cone reflector distributing sound energy radially outwardly from the radiant axis of the cone and dish reflectors.

9. A sonar system as set forth in claim 7, further comprising:
   the transducers being operable for generating sound directed into the cone reflector and the dish reflector; and
   the cone reflector and the dish reflector having a coincident radiant axis.

10. A sonar system as set forth in claim 7, further comprising:
    the field reflector positioned relative to the cone and dish reflectors to reflect ambient sound into the cone and dish reflectors along a radiant axis.

11. A sonar system comprising:
    a cone reflector, the cone reflector having a base and an apex and being shaped to define a focal ring encircling the cone in a plane perpendicular to an axis through the apex;
    an array of transducers disposed at discrete locations along the focal ring; and
    a dish reflector, the dish reflector being disposed radially outwardly from the cone reflector and shaped to define a second focal ring relative to the dish reflector;

a second array of transducers disposed at discrete locations along the second focal ring;

a cradle positioned between the cone reflector and the dish reflector in which the first and second arrays of transducers are mounted; and an annular phase wedge mounted on the cradle.

12. A sonar system as set forth in claim 11, further comprising:

a field reflector positioned across the radiant axis for distributing sound energy radially outwardly from the radiant axis of the cone and dish reflectors.

* * * * *